(12) United States Patent
Zand et al.

(10) Patent No.: US 11,650,307 B2
(45) Date of Patent: May 16, 2023

(54) AGILE INTERFERENCE DETECTION AND MITIGATION FOR MULTICARRIER PHASE RANGING SYSTEMS

(71) Applicant: Cypress Semiconductor Corporation, San Jose, CA (US)

(72) Inventors: Pouria Zand, San Jose, CA (US); Kiran Uln, Pleasanton, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 295 days.

(21) Appl. No.: 17/030,720

(22) Filed: Sep. 24, 2020

(65) Prior Publication Data

US 2021/0373149 A1 Dec. 2, 2021

Related U.S. Application Data

(60) Provisional application No. 63/033,740, filed on Jun. 2, 2020.

(51) Int. Cl.
*G01S 13/84* (2006.01)
*G01S 7/02* (2006.01)
*H04B 17/345* (2015.01)
*G01S 7/35* (2006.01)

(52) U.S. Cl.
CPC ............. *G01S 13/84* (2013.01); *G01S 7/023* (2013.01); *G01S 7/354* (2013.01); *H04B 17/345* (2015.01); *G01S 7/358* (2021.05)

(58) Field of Classification Search
CPC .......... G01S 13/84; G01S 7/023; G01S 7/354; G01S 7/358
See application file for complete search history.

(56) References Cited

U.S. PATENT DOCUMENTS

| | | | | |
|---|---|---|---|---|
| 5,969,674 | A * | 10/1999 | von der Embse | .... G01S 13/003 342/357.2 |
| 7,450,069 | B2 * | 11/2008 | Heidari-Bateni | ..... G01S 13/767 342/458 |
| 8,325,704 | B1 * | 12/2012 | Lemkin | .................. H04J 3/0667 370/347 |
| 11,172,334 | B2 * | 11/2021 | Herschfelt | ............. H04W 4/20 |
| 2002/0003490 | A1 * | 1/2002 | Chang | ..................... G01S 19/36 342/357.43 |
| 2002/0149518 | A1 * | 10/2002 | Haataja | ................... G01S 11/02 342/458 |

(Continued)

*Primary Examiner* — Marcus E Windrich

(57) ABSTRACT

A multicarrier phase ranging system and method are provided. Generally, the method includes performing a handshake between first and a second transceiver to negotiate a list of channels and a start-time for a multicarrier phase ranging process. The process includes in a first cycle exchanging a Constant Tone (CT) between the first and second transceiver in a first epoch on a first channel, and processing the CT received in the first and second transceiver to measure a difference in phase between the CT received and a reference signal. The CT received is checked for interference using software or hardware in either or both of the first and second transceiver. If no interference is detected the first and second transceiver switch to another channel and exchange the CT at a next epoch. If interference is detected, at least one channel is skipped for at least a subsequent epoch.

17 Claims, 15 Drawing Sheets

(56) References Cited

U.S. PATENT DOCUMENTS

| | | | |
|---|---|---|---|
| 2006/0083340 A1* | 4/2006 | Gezici | H04W 56/0075 |
| | | | 375/358 |
| 2020/0113006 A1* | 4/2020 | Bloechl | G01S 5/14 |
| 2021/0014844 A1* | 1/2021 | Lee | H04W 52/0216 |
| 2022/0039162 A1* | 2/2022 | Nandagopalan | H04W 74/0816 |
| 2022/0050162 A1* | 2/2022 | Zand | H04W 4/026 |
| 2022/0141709 A1* | 5/2022 | Simileysky | H04L 12/40071 |
| | | | 370/329 |

* cited by examiner

AGILE INTERFERENCE DETECTION AND MITIGATION FOR MULTICARRIER PHASE RANGING SYSTEMS

CROSS-REFERENCE TO RELATED APPLICATIONS

This application claims the benefit of priority under 35 U.S.C. 119(e) to U.S. Provisional Patent Application Ser. No. 63/033,740, filed Jun. 2, 2020, which is incorporated by reference herein in its entirety.

TECHNICAL FIELD

This disclosure relates generally to wireless systems, and more particularly, to wireless devices including multicarrier phased-based ranging systems and methods for operating the same to detect and mitigate the effect of interference in such systems.

BACKGROUND

The use of wireless networking, such as Bluetooth (BT), Bluetooth Low Energy (BLE) and various IEEE 802.15.4 protocol, to wirelessly connect devices including radio-frequency identification (RFID) tags, security systems, entertainment devices, appliances and communication or computing devices has grown exponentially. In many applications, it is necessary to measure a distance or range between devices in a wireless network. For example, proximity-based access tags such as passive keyless entry systems (PKES) are widely used to unlock, lock or start a vehicle, contactless smart cards are used in cashless payment systems, transponders used in parking and highway toll fee collection, and radio-frequency identification (RFID) tags are commonly used in electronic passports and for personnel tracking or inventory control. Numerous ranging techniques that use wireless signals to measure a distance or range between devices in a wireless network have been developed. One of the most promising of these ranging techniques is phase ranging in which a distance between two wireless devices is measured by determining a phase difference between a Constant Tone (CT) or continuous wave carrier signal transmitted by an initiating device or initiator and received by a reflecting device or reflector, and a reference signal generated by a local oscillator in the reflector. Generally, the phase ranging process begins with the two devices perform a handshaking, by which they agree on ranging parameters, such as a channel or frequency to be used and a time to start the ranging process. Then, the initiator sends a CT toward the reflector. The CT is sent either alone or together with a packet. Unlike the CT, which is an unmodulated carrier, the packet is sent using a modulated carrier. The packet can include, for example, a Constant Tone Extension (CTE) packet used in Angle of Arrival (AoA) and Angle of Departure (AoD) for direction finding processes. On receiving the signal, the reflector locks or synchronizes a local oscillator to the received signal, measures a phase difference between the received signal and the reference signal, and transmits a new CT toward the initiator. The initiator, which has changed mode of operation to become the receiver, measures the phase difference between the received signal and the reference signal. Later, the reflector transmits the results back to the initiator. The initiator receives the reflector's phase measurement results, and combines the results with its own phase measurements to estimate a distance between the initiator and reflector, which is proportional to a delta phase of the received signal and the reflector reference signal.

Although in theory phase ranging can be performed using a single frequency or a narrow range of frequencies, in order to solve the half-wavelength ambiguity, two devices measure the phase shift at two separate carrier frequencies. Furthermore, in order to mitigate problems caused by multi-path fading, actual technologies using phase ranging typically involve sending multiple CT signals over multiple carrier frequencies or channels, typically up to 80 channels with 1 MHz bandwidth. Such a system is referred to as a multicarrier phase ranging systems. In multicarrier phase ranging systems, the initiator and the reflector exchange at least two CT signals at two carrier frequencies or channels $f_1$ and $f_2$, in which a distance between the initiator and the reflector is proportional to the delta phase and the delta carrier $f_2 - f_1$. A sample of multicarrier phase based ranging solution is illustrated in FIGS. 1A and 1B, where FIG. 1A is a message sequence diagram illustrating one cycle of a multicarrier, phase ranging process, and FIG. 1B is a time and frequency diagram illustrating the process of FIG. 1A.

Referring to FIG. 1A, the initiator, device A, and reflector, device B, perform a handshaking and negotiation operation 102 in which the devices agree on parameters of the ranging process, such as channels or frequencies to be used, a length of time ($t_L$) for which each CT will be transmitted, and a time to start the ranging process. Next, a first cycle of the multicarrier phase ranging process 104 begins at an epoch or timeslot $t_1$ with the initiator, device A, (also indicated by blocks labeled A in FIG. 1B), transmitting a first CT at a first frequency $f_1$ (shown by arrow 106 in FIG. 1A), with a length of $t_L$ (shown in FIG. 1B) toward the reflector B (blocks B in FIG. 1B). On receiving the CT the reflector B locks or synchronizes a local oscillator to the received signal, performs a phase measurement and transmit a new CT back toward the initiator A, as indicated by arrow 108 in FIG. 1A. During this time the initiator (device A) has changed mode of operation to function as a receiver, and then receives the reflector's CT and measures the phase difference between the received signal and the reference signal. These steps are then repeated for n frequencies or channels ($f_1 - f_n$) at n timeslot ($t_1 - t_n$). After which the initiator and reflector exchange phase the phase measurement results 110 and the estimate a distance between the initiator and reflector.

Multicarrier phase ranging using Bluetooth Low Energy (BLE) and 802.15.4 radios can measure the distance between an initiating device and reflecting device with sub-meter accuracy, however this has been become problematic as the devices the need to coexist with interference in the 2.4 GHz industrial, scientific and medical (ISM) band as this band becomes more congested by other wireless technologies, such as Wi-Fi, Bluetooth Classic, Bluetooth LE, ZigBee and Thread. One approach to addressing this problem is a classic frequency adaptation, illustrated in FIGS. 2A and 2B. As in the multicarrier phase ranging process described above, the process using frequency adaptation begins with the initiator, device A, and reflector, device B, perform a handshaking and negotiation operation 202. Next, a ranging cycle (cycle_i 204) is performed during which interference 206 (shown in FIG. 2B as occurring at frequencies $f_i$ and $f_{i+1}$) and phase results exchanged 208. At the end of the cycle_i 204, after processing and exchanging the phase results, the two devices, initiator A and reflector B, decide to blacklist and exclude the interfering channels ($f_i$ and $f_{i+1}$) from a switching channel list to be used for subsequent ranging cycles. This blacklisting may be permanent, or for a predetermined number of multiple ranging cycles after which the previously interfering channels can be whitelisted for use in subsequent cycles. As shown in FIG. 2A, to update the switching channel list for the next cycles, a new handshaking and negotiation 210 needs to be executed between the devices after each ranging cycle through a Link Layer (LL) or higher layer negotiation. It is noted that although the above frequency adaptation approach is not wholly satisfactory as the decision to backlist the interfered channels is made after analyzing of entire phase measurement result exchange, and thus undermines the results of the entire ranging cycle. Moreover, because the interfering channels are blacklisted permanently or at least for multiple ranging cycles, the accuracy of multicarrier phase ranging process will be limited, excluding the advantages of using the entire ISM bandwidth.

Accordingly, there is a need for wireless systems or devices including multicarrier phased-based ranging systems and methods for operating the same to detect and mitigate the effect of interference in such systems without substantially affecting cost, complexity or performance of the wireless device.

SUMMARY

A multicarrier phase ranging system and method for operating the same to detect and mitigate interference are provided. Generally, the method includes performing a handshake between an initiating device (initiator) and a reflecting device (reflector) to negotiate a list of channels and a start-time for a multicarrier phase ranging process. The process includes exchanging a Constant Tone (CT) between the initiator to the reflector in an epoch on a channel, and locally processing in the initiator and the reflector In-Phase and Quadrature (IQ) samples of the CT received therein. The IQ samples are checked for interference using software or hardware in either or both of the initiator and reflector. If no interference is detected the initiator and reflector switch to another channel and exchange the CT at a next epoch. If interference is detected, at least the next channel is skipped for at least the next epoch. In some instances a number (n) of subsequent channels in the list of channels are skipped for the next n epochs based on a property of the interference detected, such as a strength of the interference, length of the interference packet, repetition of the interference packet in time domain and bandwidth of interference signal in frequency domain.

Generally, the method further includes checking to determine if the most recent channel on which the CT was exchanged is a last or final channel in the list of channels. If the most recent exchange of the CT was over the last or final channel in the list of channels, then the cycle is complete and phase measurement results are exchanged between the initiator and reflector. A subsequent cycle of the multicarrier phase ranging process is performed. In one embodiment, the subsequent cycle is performed without skipping any channels based on interference detected in the first or previous cycle (cycle_i). Alternatively, the method can include skipping any channels based on interference detected in a first or previous cycle for a number (n) of subsequent cycles, but not skipping the channels permanently, i.e., blacklisting the interfered channels.

Further features and advantages of embodiments of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to a person skilled in the relevant art(s) based on the teachings contained herein.

BRIEF DESCRIPTION OF THE DRAWINGS

Embodiments of the invention will now be described, by way of example only, with reference to the accompanying schematic drawings in which corresponding reference symbols indicate corresponding parts. Further, the accompanying drawings, which are incorporated herein and form part of the specification, illustrate embodiments of the present invention, and, together with the description, further serve to explain the principles of the invention and to enable a person skilled in the relevant art(s) to make and use the invention.

DETAILED DESCRIPTION

Figure 1A:
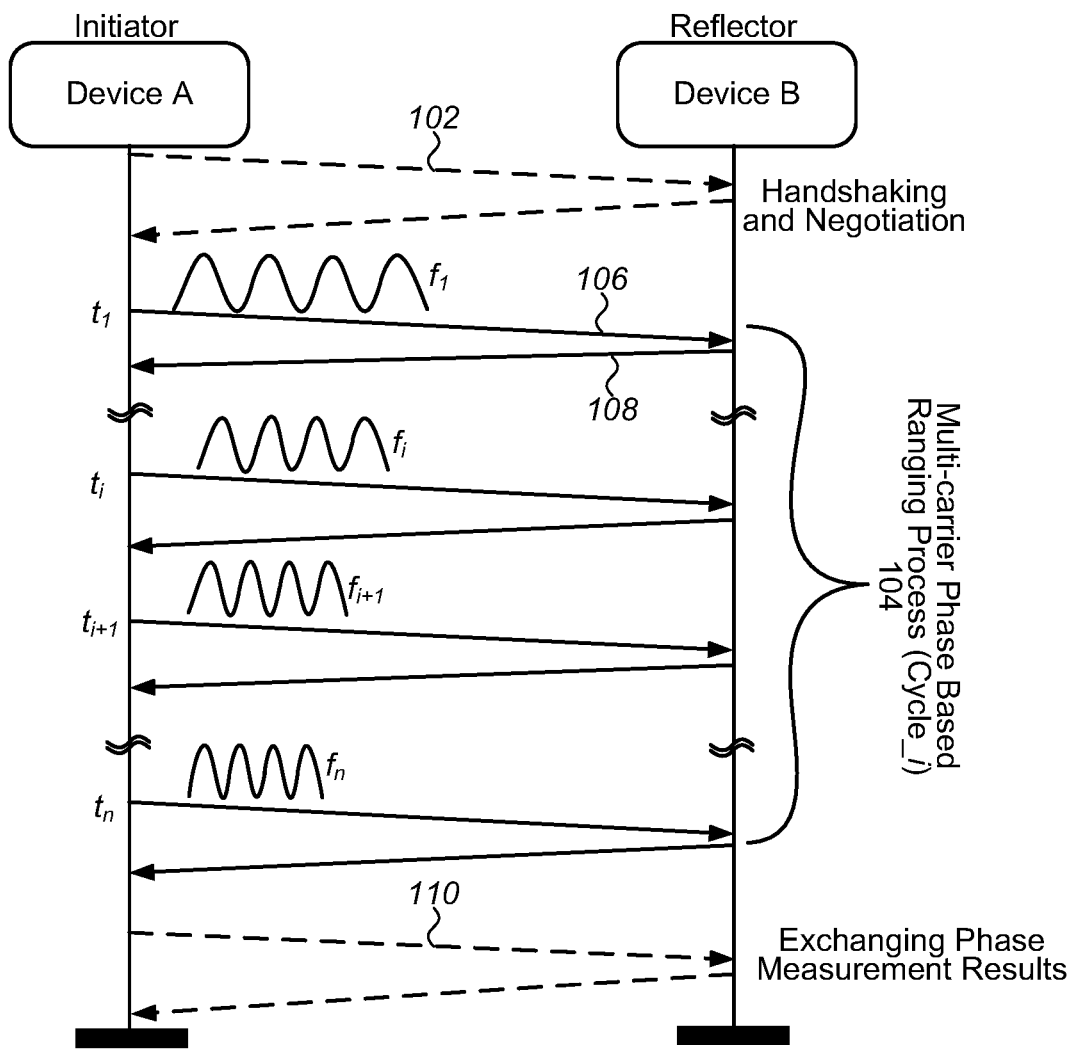
FIG. 1A is a message sequence diagram illustrating a multicarrier, phase ranging process performed over n channels.
Figure 1B:
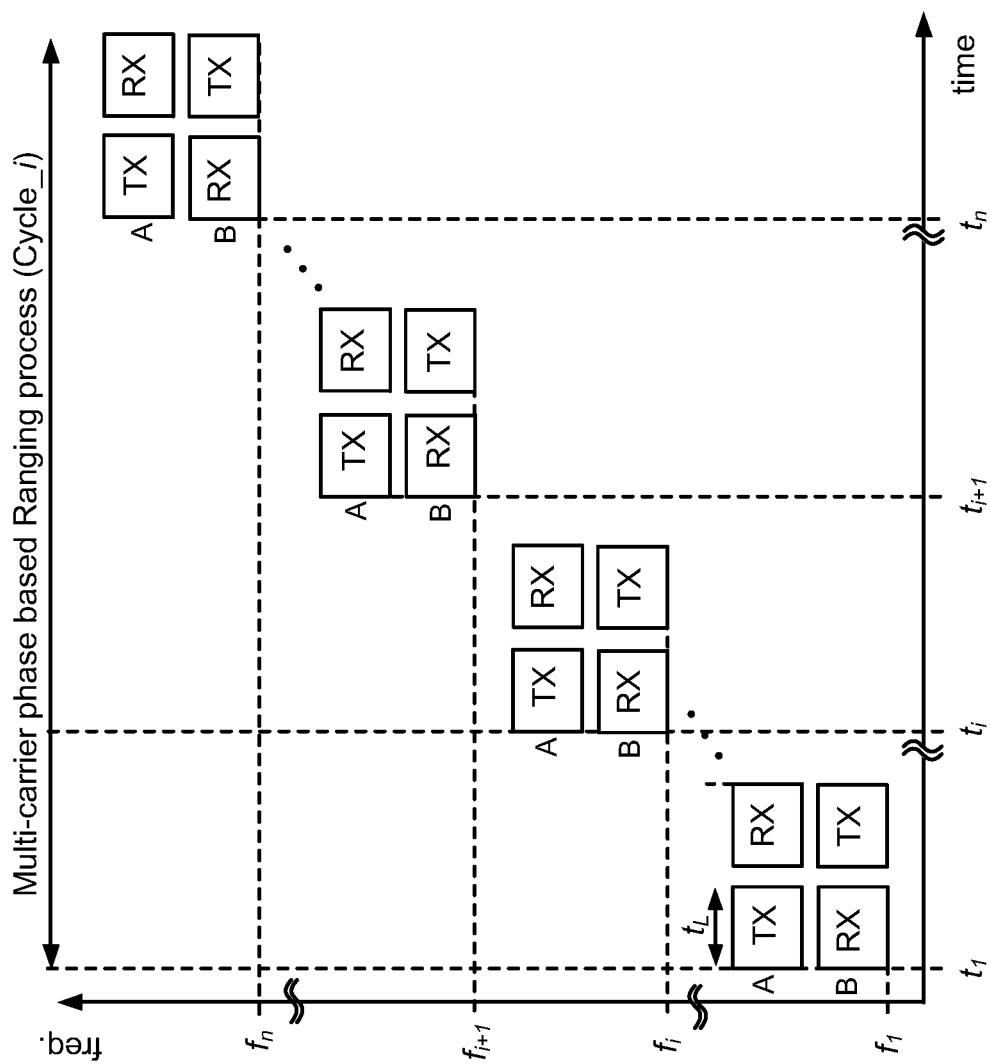
FIG. 1B is a time and frequency diagram illustrating the phase ranging process of FIG. 1A.
Figure 2A:
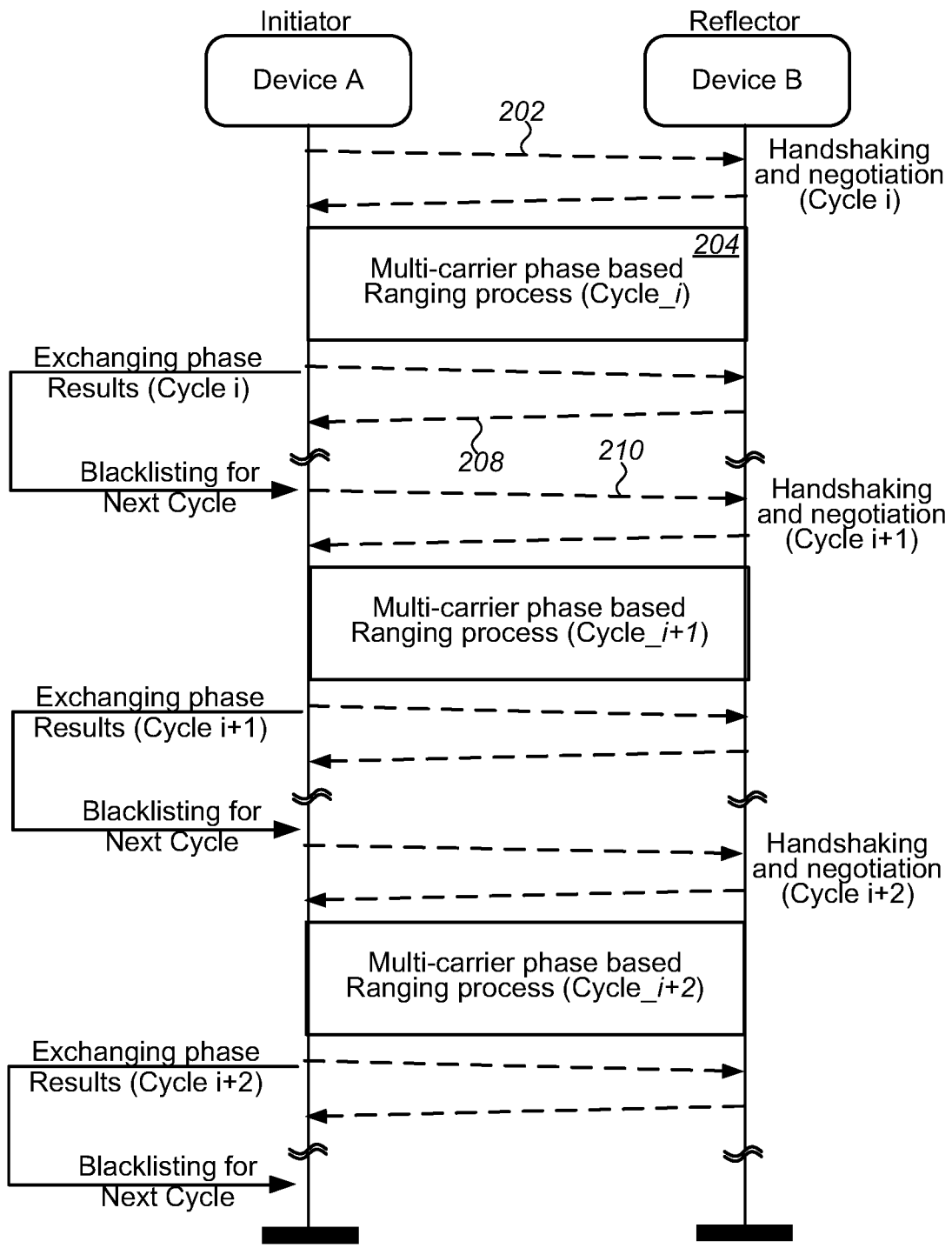
FIG. 2A is a message sequence diagram illustrating three cycles of a conventional approach to detecting and mitigating interference in multicarrier, phase ranging process.
Figure 2B:
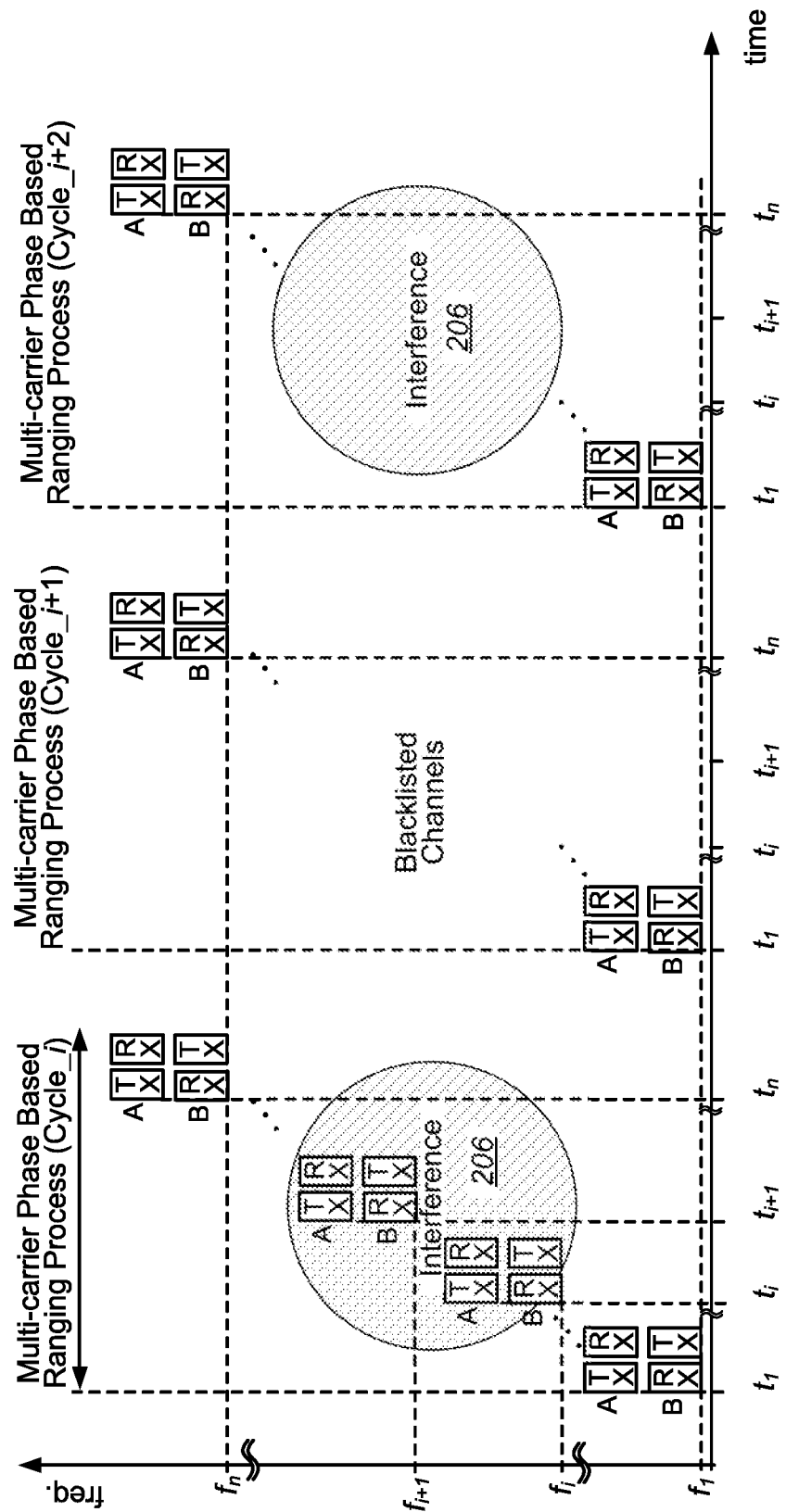
FIG. 2B is a time and frequency diagram of the phase ranging process of FIG. 2A.

A wireless network or system including a wireless device with agile multicarrier phase ranging and methods for operating the same to detect and mitigate interference to provide high accuracy distance measurements (HADM) are disclosed. The wireless device and agile multicarrier phase ranging methods of the present disclosure are particularly useful in or with wireless networks using Bluetooth (BT), Bluetooth Low Energy (BLE), various IEEE 802.15.4 and WiFi protocols, in which it is desirable to measure a distance or range between a first and second wireless device either to improve accuracy of signals passed between the devices and/or to reduce power consumption. Such devices can include, for example, proximity-based access tags such as passive keyless entry systems (PKES) are widely used to unlock, lock or start a vehicle, contactless smart cards are used in cashless payment systems, transponders used in parking and highway toll fee collection, and radio-frequency identification (RFID) tags are commonly used in electronic passports and for personnel tracking or inventory control.

In the following description, for purposes of explanation, numerous specific details are set forth in order to provide a thorough understanding of the present invention. It will be evident, however, to one skilled in the art that the present invention may be practiced without these specific details. In other instances, well-known structures, and techniques are not shown in detail or are shown in block diagram form in order to avoid unnecessarily obscuring an understanding of this description.

Reference in the description to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment. The term to couple as used herein may include both to directly electrically connect two or more components or elements and to indirectly connect through one or more intervening components.

An agile multicarrier phase ranging process will now described in which interference at one or more channels is detected during a cycle of the process, and the affected channels temporarily skipped without permanently black-listing the interfered with channels either for all timeslots or epochs in the cycle or in subsequent cycles, thereby maximizing the availability of channels for phase ranging, particularly in the heavily used 2.4 GHz industrial, scientific and medical (ISM) band. By epoch it is meant a time at which or during which communication event occurs. For example, an exchange over a channel of a constant tone (CT) between first and second wireless devices for purposes of phase ranging. By CT it is meant an unmodulated, continuous wave carrier signal at the channel frequency. By subsequent it is meant occurring later in time or on a negotiated list of channels, and not necessarily immediately thereafter or following the earlier time or channel.

Generally, the method includes performing a handshake between an initiating wireless device or transceiver (initiator) and a reflecting wireless device (reflector) to negotiate a list of channels and a start-time for a multicarrier phase ranging process. The process includes exchanging a CT between the initiator to the reflector in an epoch ($t_i$) on a channel ($f_i$), measuring a difference in phase between the received CT and a signal from a local oscillator (LO) in each device, and locally processing in the initiator and the reflector In-Phase and Quadrature (IQ) samples of the CT received therein. Optionally, the agile multicarrier phase ranging process can further include exchanging a packet between the initiator and reflector either before or after exchanging the CT. The packet exchanged can be the same as similar to a constant tone extension (CTE) packet used in Bluetooth direction finding for finding an Angle of Arrival (AoA) or Angle of Departure (AoD). The IQ samples are checked for interference using software and/or hardware in either or both of the initiator and reflector. If no interference is detected the initiator and reflector switch to a subsequent channel ($f_{i+1}$) and exchange the CT at a next epoch ($t_{i+1}$). If interference is detected, the device detecting the interference communicates with or signals the other device, and at least one subsequent channel is skipped for at least the next epoch.

Figure 3:
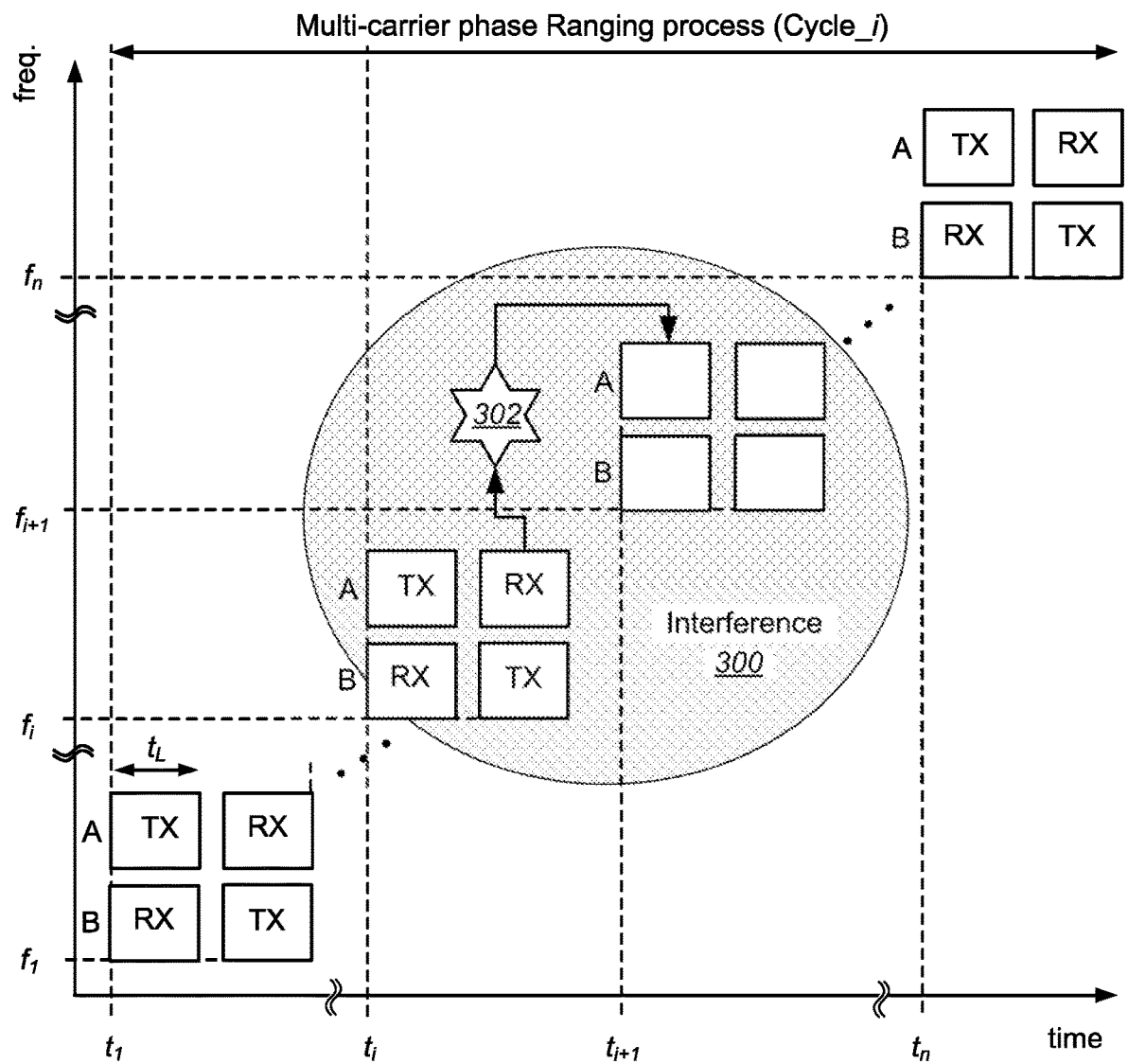
FIG. 3 is a time and frequency diagram illustrating a single cycle of an agile multicarrier phase ranging process using linear channel switching in which interference at one or more channels is detected during the cycle, and the affected channels temporarily skipped without permanently blacklisting the channels.

FIG. 3 is a time and frequency diagram illustrating an exemplary embodiment of a single cycle (cycle_i) of an agile multicarrier phase ranging process, in which channels $f_i$ and $f_{i+1}$ are affected by interference 300. Referring to FIG. 3, cycle_i begins at first epoch $t_1$ with the initiator, device A, (indicated by blocks labeled A), transmitting a CT with a length of $t_L$ on a first channel or frequency ($f_1$) toward the reflector, device B (indicated by blocks labeled B in FIG. 3). The reflector synchronizes a local oscillator (LO) to the received signal, measures a difference in phase between the CT received and a signal from a the LO, and transmits the CT back toward the initiator. The initiator (device A), which has during this time changed mode of operation to function as a receiver, then receives the reflected signal, synchronizes it to the LO therein, and measures a difference in phase between the CT received and a signal from the LO. In-Phase and Quadrature (IQ) samples of the CT received are locally processed in the initiator and reflector and checked for interference. If no interference is detected the initiator and reflector index or switch to a subsequent channel ($f_i$) and exchange the CT beginning at a subsequent epoch ($t_i$). It will be understood that neither channel ($f_i$) nor epoch ($t_i$) do not necessarily immediately follow channel ($f_1$) and epoch ($t_1$) in FIG. 3, rather the CT can be exchanged on any number of channels not experiencing interference in any number of epochs. It will further be understood that while the frequencies of the channels in FIG. 3 are shown as increasing linearly, i.e., frequency $f_i$ is greater than $f_1$, and frequency $f_{i+1}$ is greater than $f_i$, and so on, this need not be the case in every embodiment of the agile multicarrier phase ranging process. Rather, the two devices can have pseudo-linear, non-linear, non-random or pseudo-random channel switching, as explained in greater detail below.

Referring again to FIG. 3, in the exchange beginning in epoch $t_i$ either or both of the initiator and reflector executes an algorithm 302 to detect interference in either the CT, or in the packet where exchange, and upon detection of the interference to operate to skip a number of subsequent channels for a number of next epochs. For example, in the embodiment shown neither the initiator or the reflector will send a constant tone or a packet in channel $f_{i+1}$ at epoch $t_{i+1}$.

Thereafter, the initiator A and reflector B exchange CTs normally for a number of subsequent epochs, checking for interference after each exchange, until the cycle is completed with an exchange at channel $f_n$ at epoch ($t_n$). In case of pseudo-random channel switching, upon detection of the interference, the initiator or the reflector decide to skip the upcoming interfered channel at upcoming epoch, which might be multiple slots later.

Figure 4:
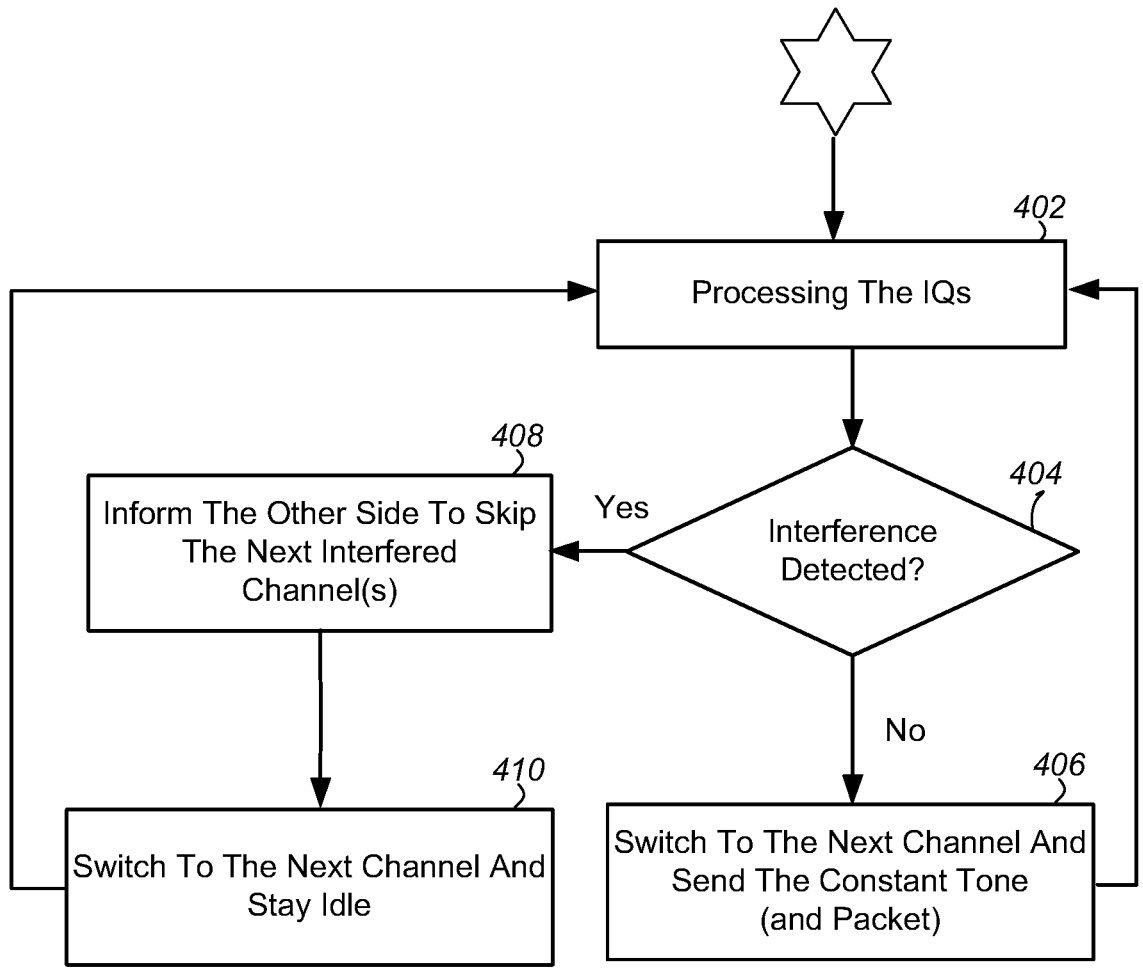
FIG. 4 is a depicts an algorithm by which a first wireless transceiver or ranging device or a second wireless transceiver make a local decision for temporarily skipping a number of next constant tone exchange(s) in a number of next epoch(s)

FIG. 4 is a flowchart depicting an algorithm by which an initiator ranging device or a reflector ranging device make a local decision for temporarily skipping a number of next constant tone exchange(s) in a number of next epoch(s). Referring to FIG. 4, after reception of the CT, and where included the packet, the initiator or the reflector will perform the phase measurement and will sample and process multiple IQ signals of the CT received (402). The collection of these IQ samples should have a distribution with a predetermined standard deviation, and depending on the actual standard deviation of the distribution, either the initiator or reflector can determine if the CT exchanged has been affected by interference or not (404). In addition, for some applications, the initiator or the reflector can include more than one antenna, and if signals from all antennas of a single device exhibit large amounts of noise and/or large standard deviations, then the device can conclude the CT is affected by the interference. If no interference is detected, the initiator will switch to the next channel and at the next epoch send the CT, and packet, (406), and continue with processing of the sampled IQs (402). If interference is detected, the detecting device (either the initiator or reflector), will inform the other device to skip a number of subsequent channels, which are likely to also be interfered channels (408), and to switch to the next channel of the negotiated list of channels and stay idle for a number of epochs, beginning with the next epoch (410). Normal operation can resume with the next non-skipped channel beginning with processing of the sampled IQs (402) after the number of epochs have passed. The number of channels skipped and the number of idle epochs can depend on properties of the interference detected, and/or a signal path of the CT. For example, single path and/or multipath channels will have a stable phase (single tone) type feature. Thus, the only deviation from this will be due to noise and/or phase/frequency drift, and the number of channels skipped can be small. However, interference caused by a very fast phase change, which is proportional to the bandwidth of the interferer, may lead to skipping multiple subsequent channels.

Figure 5:
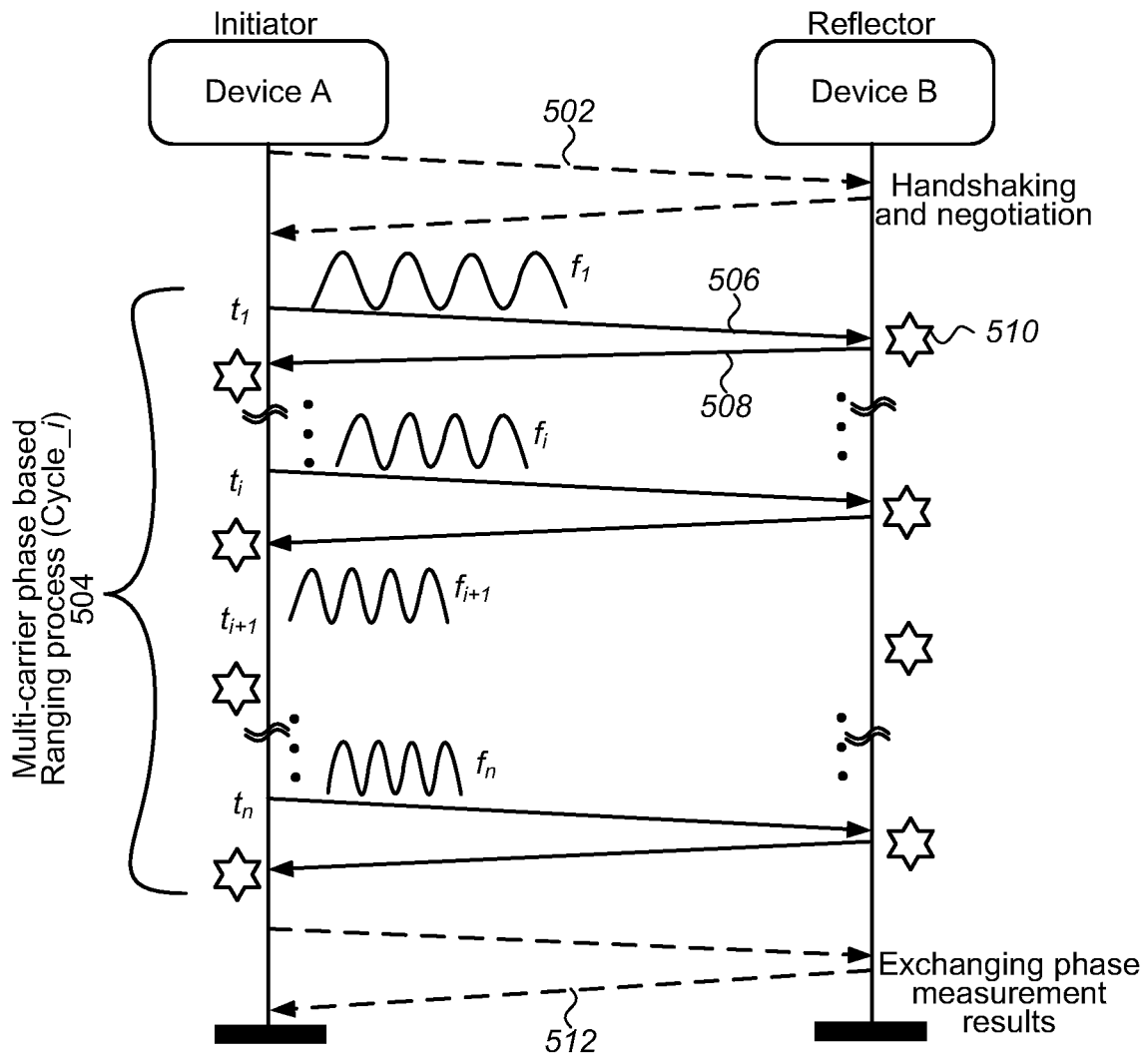
FIG. 5 is a message sequence diagram of a single cycle of the agile multicarrier phase ranging process illustrating where an initiator or a reflector ranging device, make a local decision at each frequency to either exchange the constant tone for a next epoch and/or skip the constant tone exchange for a number of subsequent channels.

FIG. 5 is a message sequence diagram of a single cycle of the agile multicarrier phase ranging process described above with respect to FIGS. 3 and 4. Referring to FIG. 5, the initiator, device A, and reflector, device B, perform a handshaking and negotiation operation 502 in which the devices agree on parameters of the ranging process, such as channels or frequencies to be used, a length of time ($t_L$) for which each CT will be transmitted, and a time to start the ranging process. Next, a first cycle of the multicarrier phase ranging process 504 begins at epoch $t_1$ with the initiator, device A, transmitting a first CT at a first frequency $f_1$ (as indicated by arrow 506) toward the reflector B. On receiving the CT the reflector B locks or synchronizes a local oscillator to the received signal, performs a phase measurement and transmit the CT back toward the initiator A, as indicated by arrow 508. Device A receives the reflected CT and performs a phase measurement. At each frequency, the initiator or the reflector will execute an algorithm 510 to decide for the next epoch and the next channel to either exchange the CT or stay idle and skip the exchange. If either device detects the interference, it will immediately inform the other side about the presence of interference and will temporarily stay idle and skip the constant tone exchange process for that interfered channel. For example, in the embodiment shown in FIG. 5 where interference was detected by the reflector B during the exchange of CT at channel $f_i$, as in the embodiment shown in FIG. 3, the initiator A and the reflector B decide to stay idle and skip the CT exchange for channel $f_{i+1}$. The preceding steps are then repeated for frequencies or channels $f_i$ through $f_n$, at the remaining epochs until the last epoch $t_n$. After which the initiator and reflector exchange phase measurement results 512 and the estimate a distance between the initiator and reflector.

Figure 6:
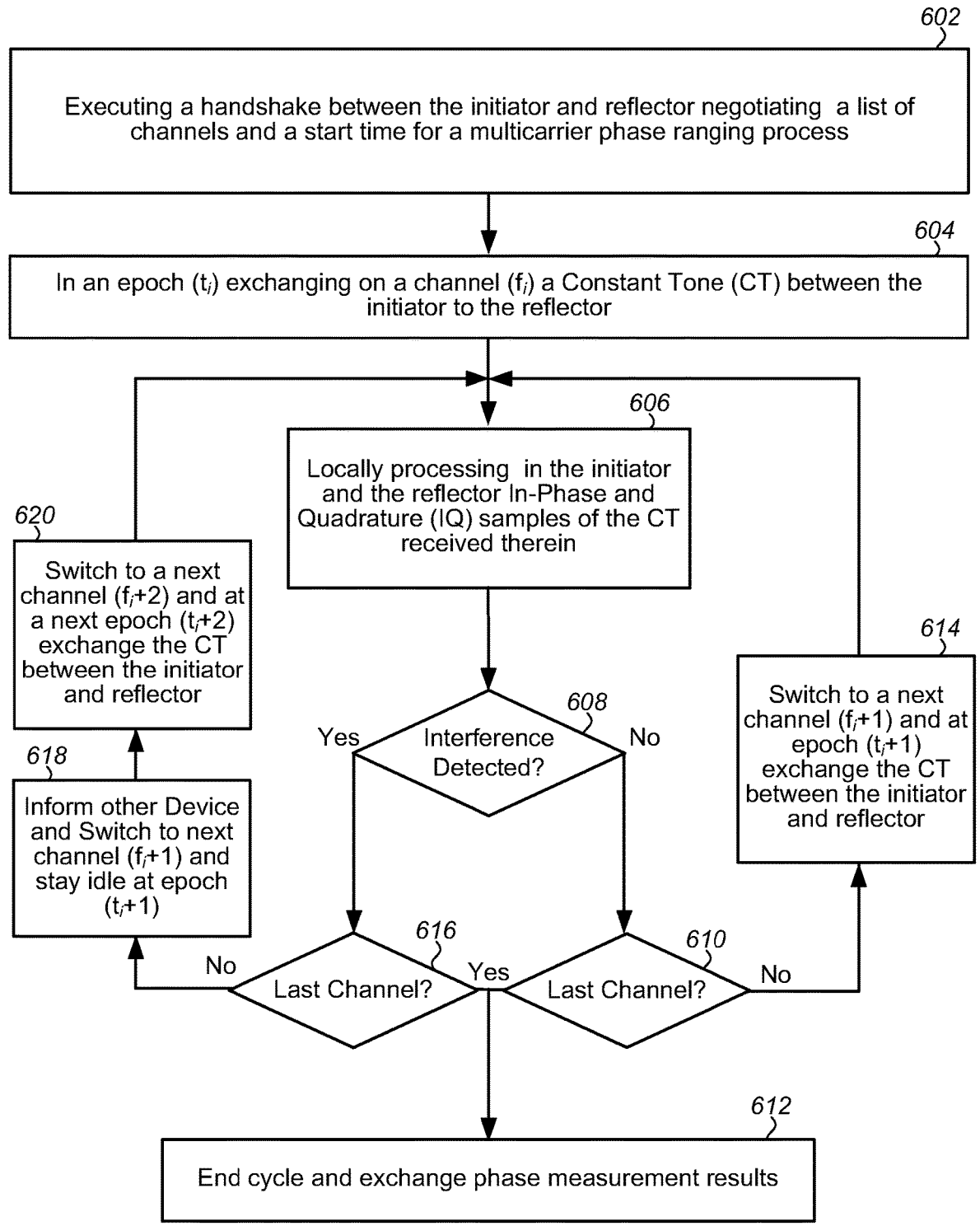
FIG. 6 is flowchart of a method for performing the agile multicarrier phase ranging process.

FIG. 6 is flowchart of a method for performing the agile multicarrier phase ranging process described above with respect to FIGS. 3 through 5. Referring to FIG. 6, the method begins with executing a handshake between the initiator and reflector negotiating a list of channels ($f_1$ to $f_n$) and a start time for a cycle (cycle_i) of a multicarrier phase ranging process (602). Next, in an epoch ($t_i$) exchanging on a channel ($f_i$) a CT between the initiator to the reflector (604). In-Phase and Quadrature (IQ) samples of the CT received in the initiator and the reflector are locally processed therein (606), and interference checked by either or both the initiator or reflector (608). If no interference is detected, a check is performed to see if the most recently exchanged CT was on the last channel of the negotiated list of channels (610). If the most recent channel was the last channel, the cycle is ended and the initiator and reflector exchange phase measurement results (612). If the most recent channel was not the last channel, the initiator switches to a subsequent or next channel ($f_{i+1}$) and at epoch ($t_{i+1}$) exchange the CT between the initiator and reflector (614) and resumes local processing (606) for the cycle.

If interference is detected, a check is performed to see if the most recently exchanged CT was on the last channel of the negotiated list of channels (616). If the most recent channel was the last channel, the cycle is ended and the initiator and reflector exchange phase measurement results (612). If the most recent channel was not the last channel, the device (initiator or reflector) detecting the interference will inform or signal the other device (initiator or reflector) and switch to a subsequent or next channel ($f_{i+1}$) and stay idle at epoch ($t_{i+1}$) (618). Informing or signaling the other device can accomplished by either not sending a CT on the next channel in the list of channels, thereby implicitly signaling the device of the interference, or by sending a CT with a shorter than expected length. Alternatively, where the process includes exchanging a packet between the initiator and reflector, informing or signaling the other device of the interference can include: i) not transmitting a packet; ii) sending a packet with a specific Access Address; or iii) sending a packet with information or instructions to skip a number of channels. At the next or a subsequent epoch ($t_{i+2}$) the initiator will switch to a subsequent or next channel ($f_{i+2}$), exchange the CT between the initiator and reflector (620) and thereafter resume local processing (606) for the cycle.

Optionally, after the first or intermediate cycle (cycle_i) has ended and phase measurement results exchanged (612), the method can further include a performing a second or subsequent handshake (602) and performing a second or subsequent cycle (cycle_i+1) of the multicarrier phase ranging process without skipping any channels in the list of channels based on interference detected in the first or previous cycle (cycle_i). In some embodiments, the method further includes performing a number (n) of subsequent cycles while skipping any channels in the list of channels skipped in the previous or current cycle (cycle_i) based on interference detected.

Figure 7:
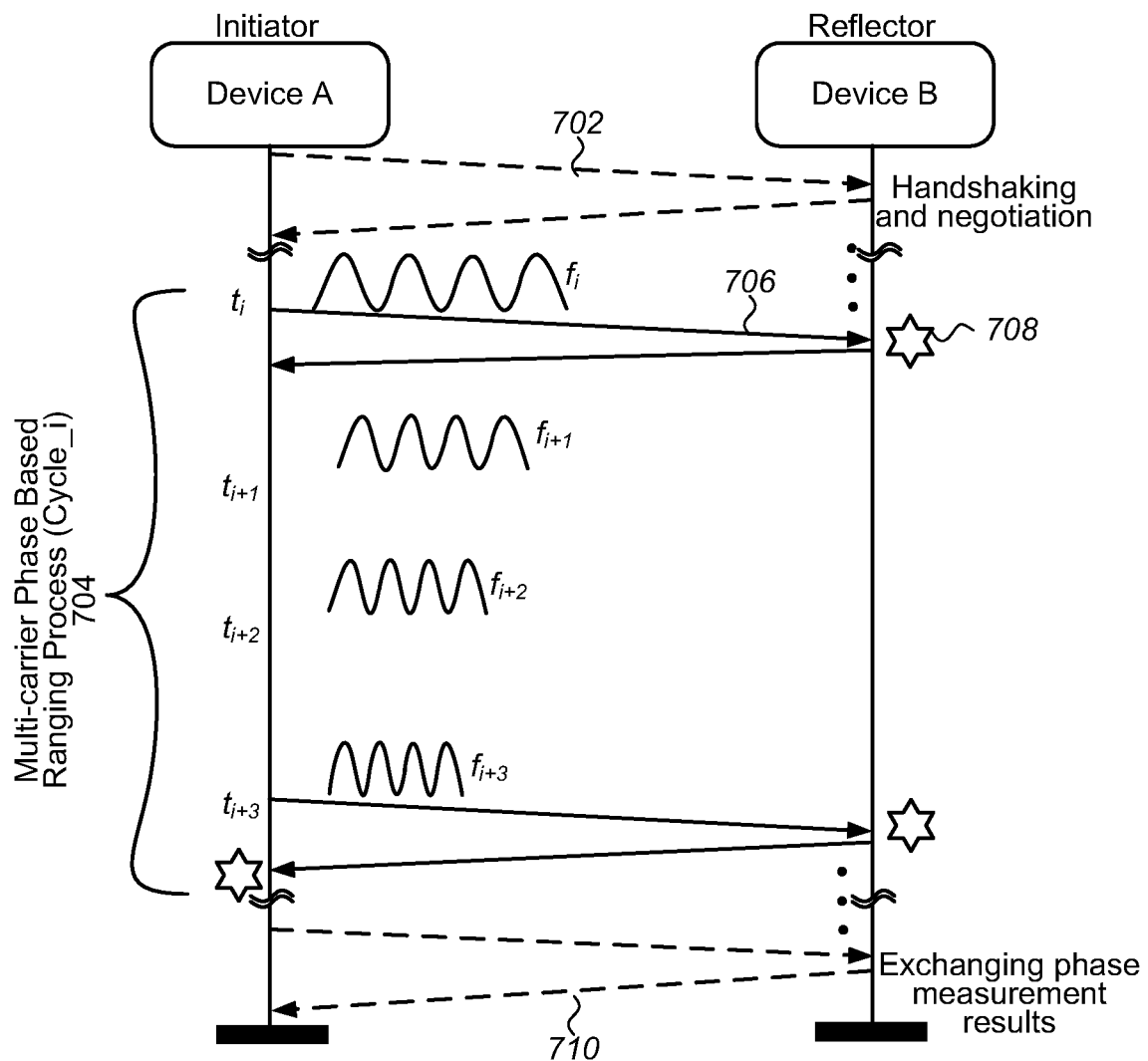
FIG. 7 is another message sequence diagram of a single cycle of the agile multicarrier phase ranging process illustrating where, depending on properties of an interference detected, the initiator or reflector ranging device, will decide whether to skip the constant tone exchanges for more than one epoch and/or more than one channel.

FIG. 7 is another message sequence diagram of another embodiment of a single cycle of the agile multicarrier phase ranging process illustrating where, depending on properties of an interference detected, the initiator or reflector ranging device, will decide whether to skip the constant tone exchanges for more than one epoch and/or more than one channel. Referring to FIG. 7, the initiator, device A, and reflector, device B, perform a handshaking and negotiation operation 702 in which the devices agree on parameters of the ranging process, such as channels or frequencies to be used, a length of time ($t_L$) for which each CT will be transmitted, and a time to start the ranging process. Next, a cycle of the multicarrier phase ranging process 704 is shown at epoch $t_i$ at the initiator, device A, when transmitting a CT at a frequency $f_i$ (as indicated by arrow 706) toward the reflector B. On receiving the CT, the reflector B executes an algorithm 708 and detects interference. Upon detection of interference at channel $f_i$ at epoch $t_i$, the two devices will decide to stay idle and to skip the next two CT exchanges for channels $f_{i+1}$ and $f_{i+2}$ at epochs $t_{i+1}$ and $t_{i+2}$. After which the initiator and reflector exchange phase measurement results 710 and the estimate a distance between the initiator and reflector.

Figure 8:
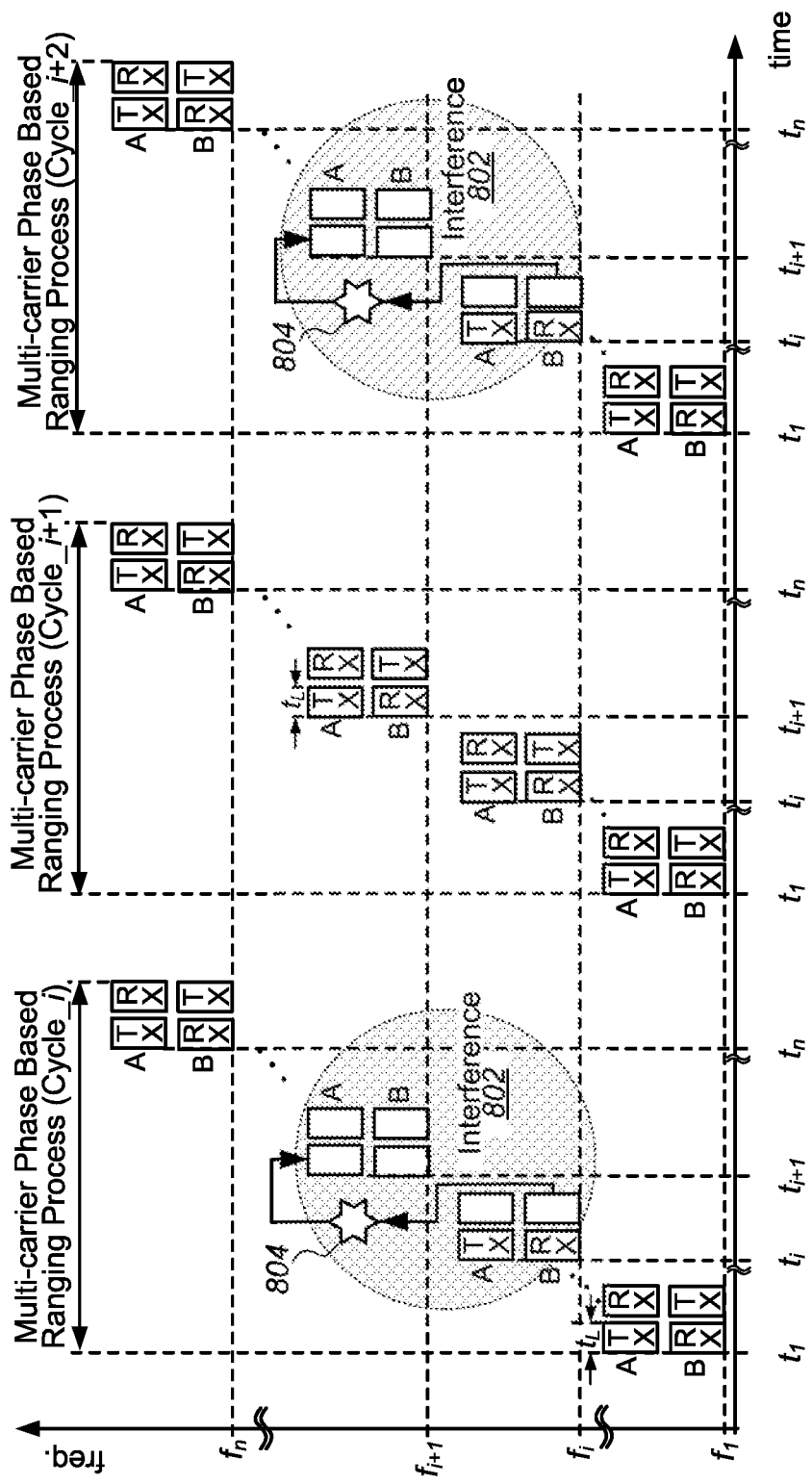
FIG. 8 is a time and frequency diagram illustrating three cycles of an agile multicarrier phase ranging process in which in which two channels are affected by interference in a first and third cycles.

FIG. 8 is a time and frequency diagram illustrating three cycles of an agile multicarrier phase ranging process in which in which two channels are affected by interference 802 in the first and third cycles. Referring to FIG. 8 it is noted that channels $f_i$ and $f_{i+1}$ are affected by interference 802 in cycle_i and cycle_i+2. In Cycle_i, the reflector executes the algorithm 804, and upon detection of the interference in the epoch $t_i$, will inform the initiator (e.g., by not responding) to be idle at the current channels $f_i$ and the next $f_{i+1}$ in the current cycle. In the next cycle, cycle_i+1, the two devices decide to go back to normal operation and to check again if the channels $f_i$ and $f_{i+1}$ are free or interfered. In this example, as in cycle_i+1, those channels are not interfered, the two devices will exchange the constant tones. In cycle_i+2, again upon detection of the interference 802, the two devices decide to stay idle and to skip again the tone exchange. FIG. 8 illustrates the ability of the agile multicarrier phase ranging process to maximize the availability of channels for phase ranging.

Figure 9:
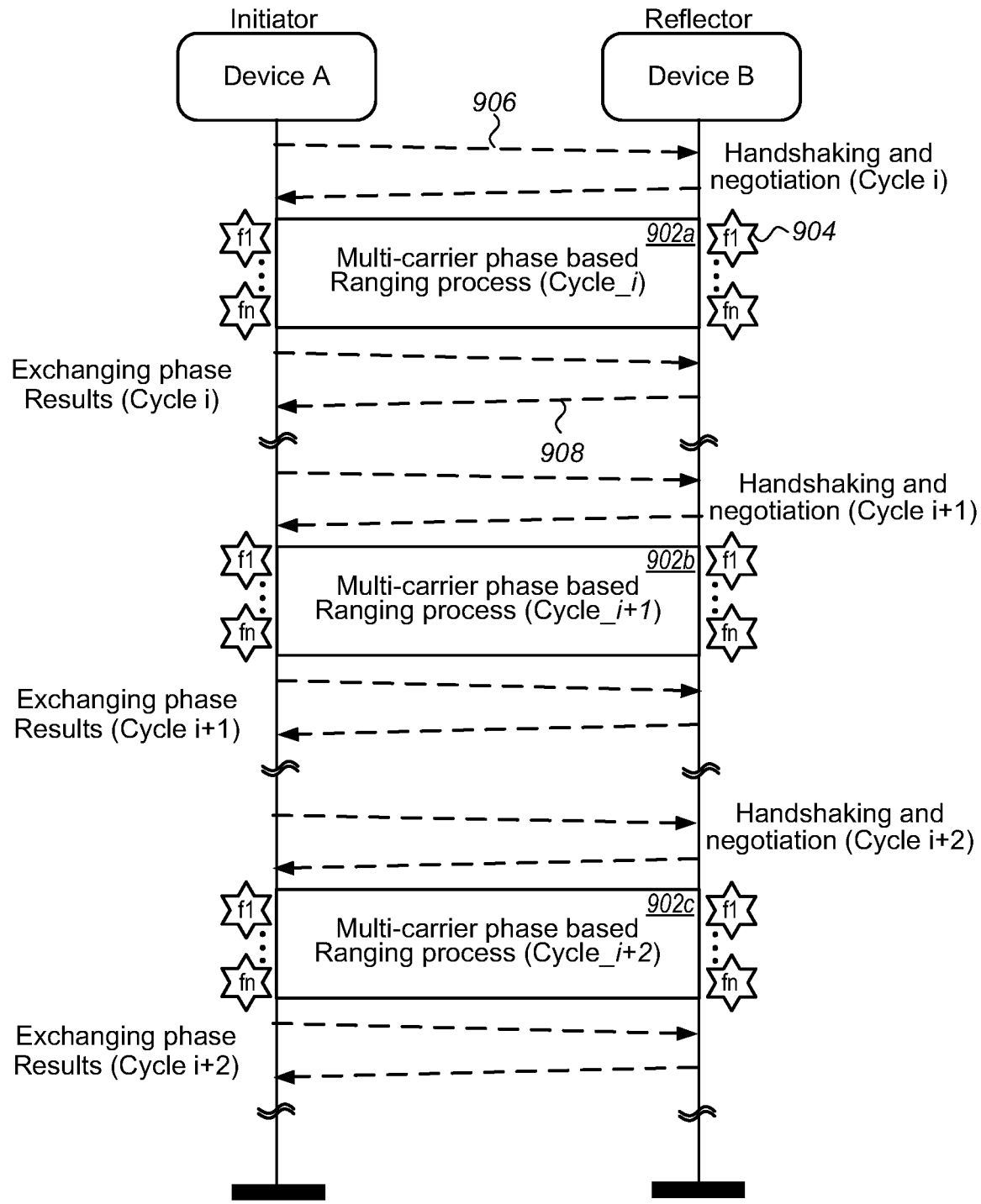
FIG. 9 is a message sequence diagram illustrating the three cycles of an agile multicarrier phase ranging process in which at each tone exchange at each channel, the initiator or reflector ranging device will decide either to exchange a constant tone or stay idle and skip the tone exchange.

FIG. 9 is a message sequence diagram illustrating three cycles 902a, 902b, 902c, of an agile multicarrier phase ranging process in which at each CT exchange at each channel, the initiator or reflector ranging device will execute an algorithm 904 and decide either to exchange a CT or to stay idle and skip the tone exchange. Preceding each cycle 902a, 902b, 902c, the initiator (device A) and reflector (device B) perform a handshake 906 negotiating a list of channels ($f_1$ to $f_n$) and a start time for the ranging cycle. Following each cycle 902a, 902b, 902c, the initiator (device A) and reflector (device B) exchange phase measurement results 908 and the estimate a distance between the initiator and reflector. Optionally, in some embodiments the handshake includes identifying channels ($f_1$ to $f_n$ in which interference was detected in a previous cycle 902a, 902b, 902c, and performing a subsequent cycle includes skipping exchanging the CT on channels in which interference was detected for at least one cycle.

An embodiment of an agile multicarrier phase ranging process using pseudo-random channel switching will now be described with reference to FIGS. 10 and 11. In the pseudo-random channel hopping scenario, upon detection of interference at channel $f_i$ at epoch $t_i$, the two devices will decide to stay idle and to skip the next two upcoming CT exchanges for adjacent channels $f_{i+k}$ and $f_{i+k+1}$ which are scheduled k epochs later at epochs $t_{i+k}$ and $t_{i+k+1}$. Briefly, pseudo-random channel switching refers a process in which channels over which the CT is exchanged in sequential epochs are not necessarily adjacent to one another or monotonically increasing or decreasing in frequency. For example, in FIG. 10 it is seen that at a first epoch ($t_1$) in a cycle (cycle_i) of an agile multicarrier phase ranging process CT signals are exchanged between an initiator (A) and reflector (B) over a channel having a frequency of $f_{i+2}$. At a subsequent epoch ($t_i$) the channel switches or hops to a channel having a lower frequency of $f_i$, and at a next epoch ($t_{i+1}$) to a channel having an even lower frequency of $f_1$. However, at an immediately following epoch ($t_{i+2}$) the channel switches or hops to a channel having a higher frequency of $f_{i+1}$, and in a subsequent epoch ($t_n$) the channel switches or hops to an even higher frequency of $f_n$.

Figure 10:
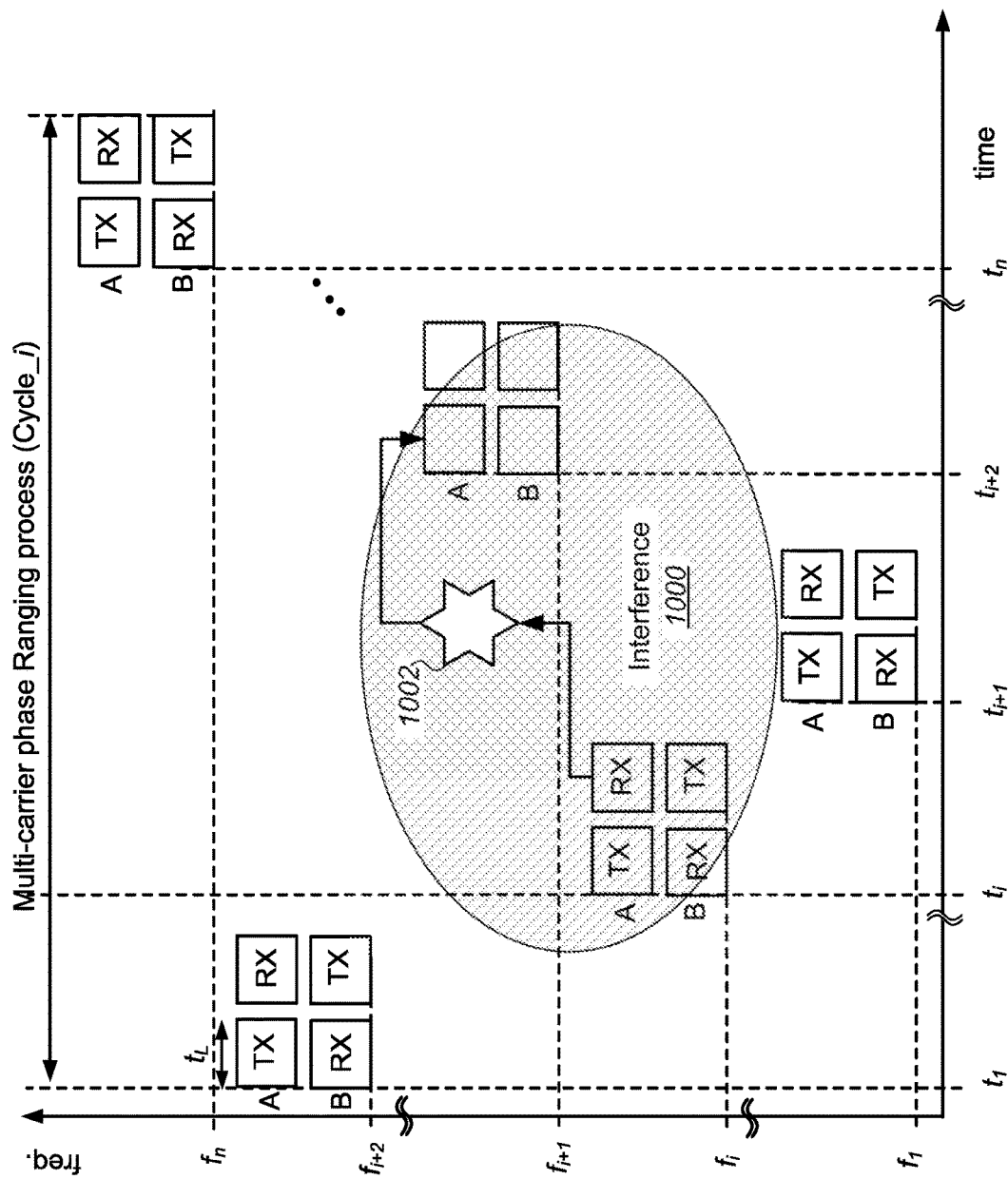
FIG. 10 is a time and frequency diagram illustrating a single cycle of an agile multicarrier phase ranging process using pseudo-random channel switching in which interference at one or more channels is detected during the cycle, and the affected channels temporarily skipped.

Referring to FIG. 10, in an agile multicarrier phase ranging process in which pseudo-random channel switching is used, as in the linear switching embodiments describe above, either or both of the initiator A and reflector B executes an algorithm 1000 following each CT exchange beginning at a first epoch $t_1$. Upon detection of interference 1002 at channel $f_i$ at epoch $t_i$, the two devices, that is the initiator A and reflector B, will decide to stay idle and to skip a upcoming or subsequent CT exchange for adjacent channel $f_{i+1}$, which, in the embodiment shown, is scheduled two epochs later at epoch ($t_{i+2}$). Thus, in the next, immediately following epoch ($t_{i+1}$), the initiator A and reflector B exchange CTs normally for channel $f_1$, which is not subject to interference 1002. Then at epoch ($t_{i+2}$) as previously decided, the initiator A and/or reflector B stay idle and skip a CT exchange for interfered channel $f_{i+1}$. Thereafter, the initiator A and reflector B exchange CTs normally for a number of subsequent epochs, checking for interference after each exchange, until the cycle is completed with an exchange at channel $f_n$ at epoch ($t_n$).

Figure 11:
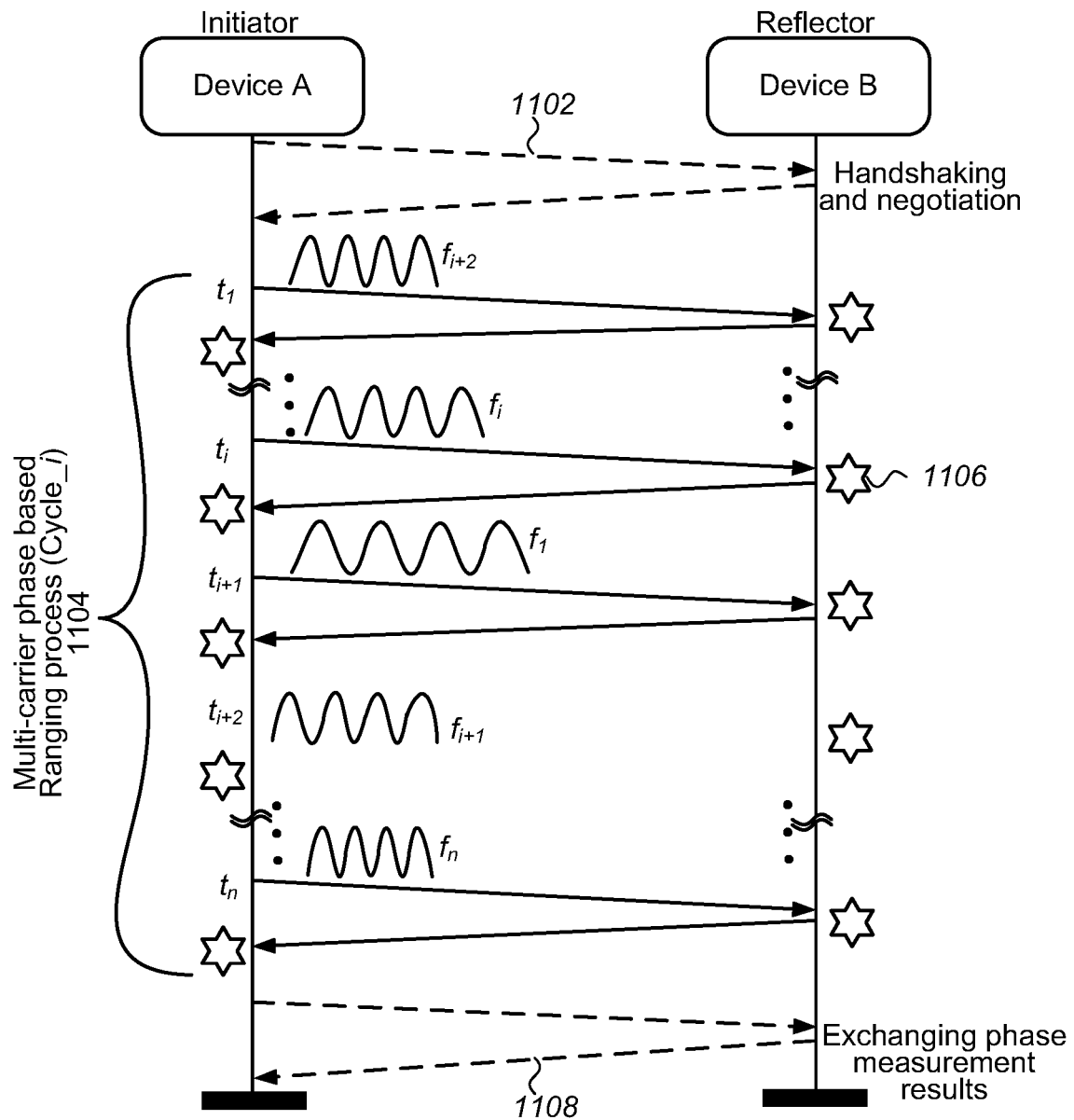
FIG. 11 is a message sequence diagram illustrating one cycle of the agile phase ranging process of FIG. 10.

FIG. 11 is a message sequence diagram illustrating one cycle of the agile phase ranging process of FIG. 10. Referring to FIG. 11 the message sequence begins with the initiator, device A, and reflector, device B, performing a handshaking and negotiation operation 1102 in which the devices agree on parameters of the ranging process, such as channels to be used, a length of time ($t_L$) for which each CT will be transmitted, and a time to start the ranging process. Additionally, in the pseudo-random channel switching scenario the initiator A and reflector B agree on a pseudo-random order for the channel switching. Next, a first cycle of the multicarrier phase ranging process 1104 begins at epoch $t_1$ with the initiator, device A, transmitting a first CT at a frequency or channel between $f_1$ and $f_n$ chosen based on the agreed to pseudo-random order. In the embodiment shown the exchange at epoch $t_1$ is on channel $f_{i+2}$. After each exchange, the initiator A and/or the reflector B will execute an algorithm 1106 to decide for the next or nearest adjacent channel in the agreed on list of channels to, at the appropriate or associated epoch, either exchange the CT or stay idle and skip the exchange. Thus, in a subsequent epoch $t_i$, when the reflector B detects interference, the initiator A and the reflector B locally decide to skip CT exchange on the next adjacent channel $f_{i+1}$ at the appropriate epoch, but in the next, immediately following epoch $t_{i+1}$ the initiator and reflector exchange CT on non-interfered channel $f_1$. At epoch $t_{i+2}$ the initiator and reflector skip the CT exchange on interfered channel $f_{i+1}$ as previously decided locally. Thereafter, the initiator A and reflector B exchange CTs normally for a number of subsequent epochs, checking for interference after each exchange, until the cycle is completed with an exchange at channel $f_n$ at epoch ($t_n$). After the cycle is completed the initiator and reflector exchange phase measurement results 1108 and the estimate a distance between the initiator and reflector.

As with the embodiments described above, the agile multicarrier phase ranging process in the pseudo-random channel scenario can be, and generally is, repeated for any number of cycles, each preceded by another a handshaking and negotiation operation 1102. These subsequent cycles can be performed without skipping any channels based on interference detected in a previous cycle, or channels on which interference detected in the previous cycle can be skipped for a number of subsequent cycles, without permanently blacklisting the previously interfered channels.

Figure 12:
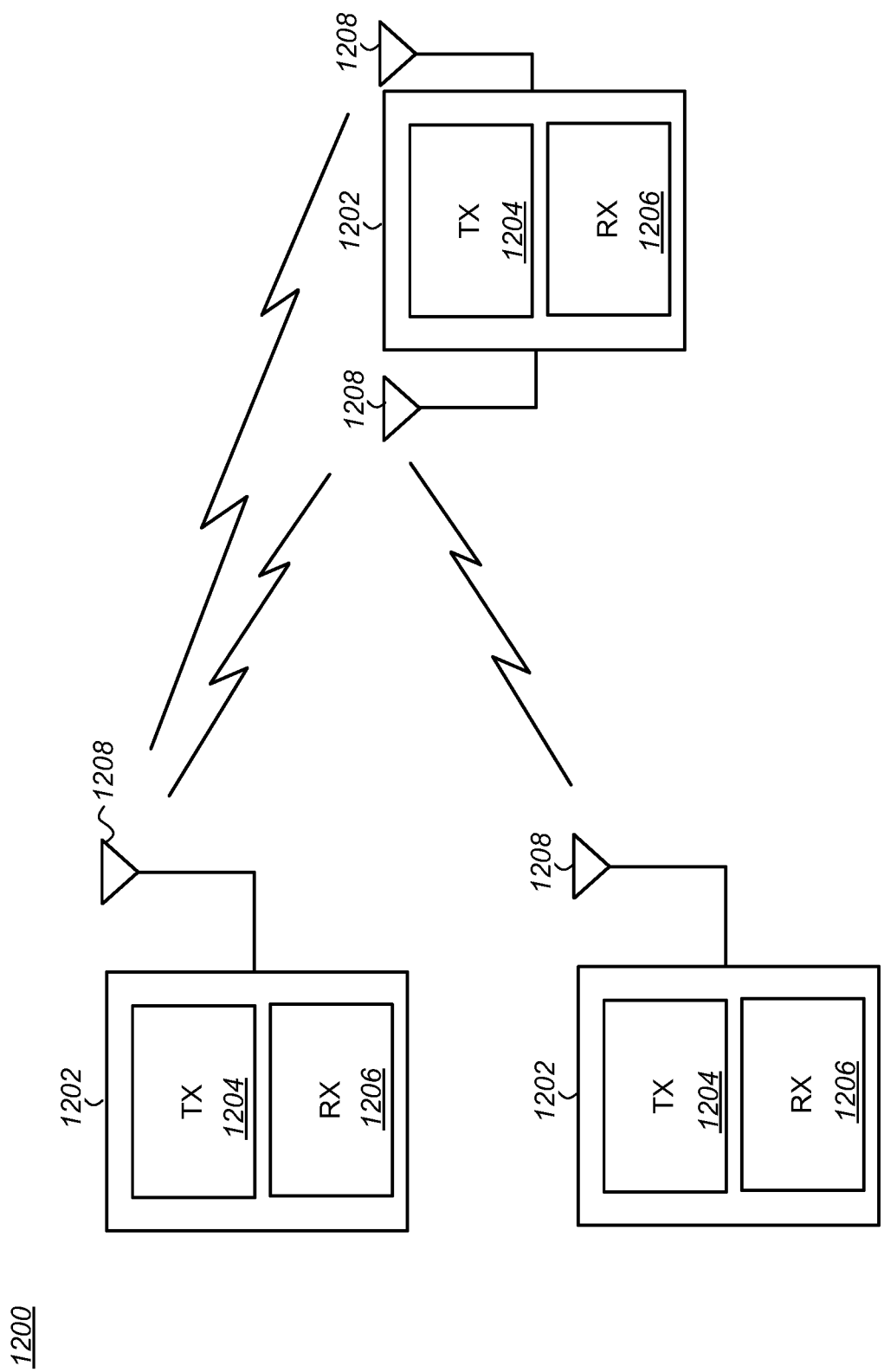
FIG. 12 is a schematic block diagram illustrating a system including a number of multi-frequency or multi-channel transceivers for which the agile multicarrier phase ranging process is useful.

FIG. 12 is a schematic block diagram illustrating a system for which the agile multicarrier phase ranging process is useful. Referring to FIG. 12 the system 1200 generally includes two or more wireless devices 1202, such as transceivers or transponders, each including a transmitter 1204, a receiver 1206 and one or more antennas 1208. Each of the wireless devices 1202 include a Bluetooth Low Energy (BLE) or 802.15.4 radio capable of operating at multiple frequency or channels in bands including the 2.4 GHz industrial, scientific and medical (ISM) band. Each of the wireless devices 1202 include hardware and software to measure a distance between an initiating device and reflecting device with sub-meter accuracy by measuring phase differences in a CT exchanged between the initiating and reflecting device. Additionally, at least one of the wireless devices 1202 in a ranging pair, either the initiating or the reflecting device, further include an architecture to execute an algorithm and make a local decision either to exchange the constant tone or skip the tone exchange for the subsequent channel(s) and/or epoch(s).

Figure 13:
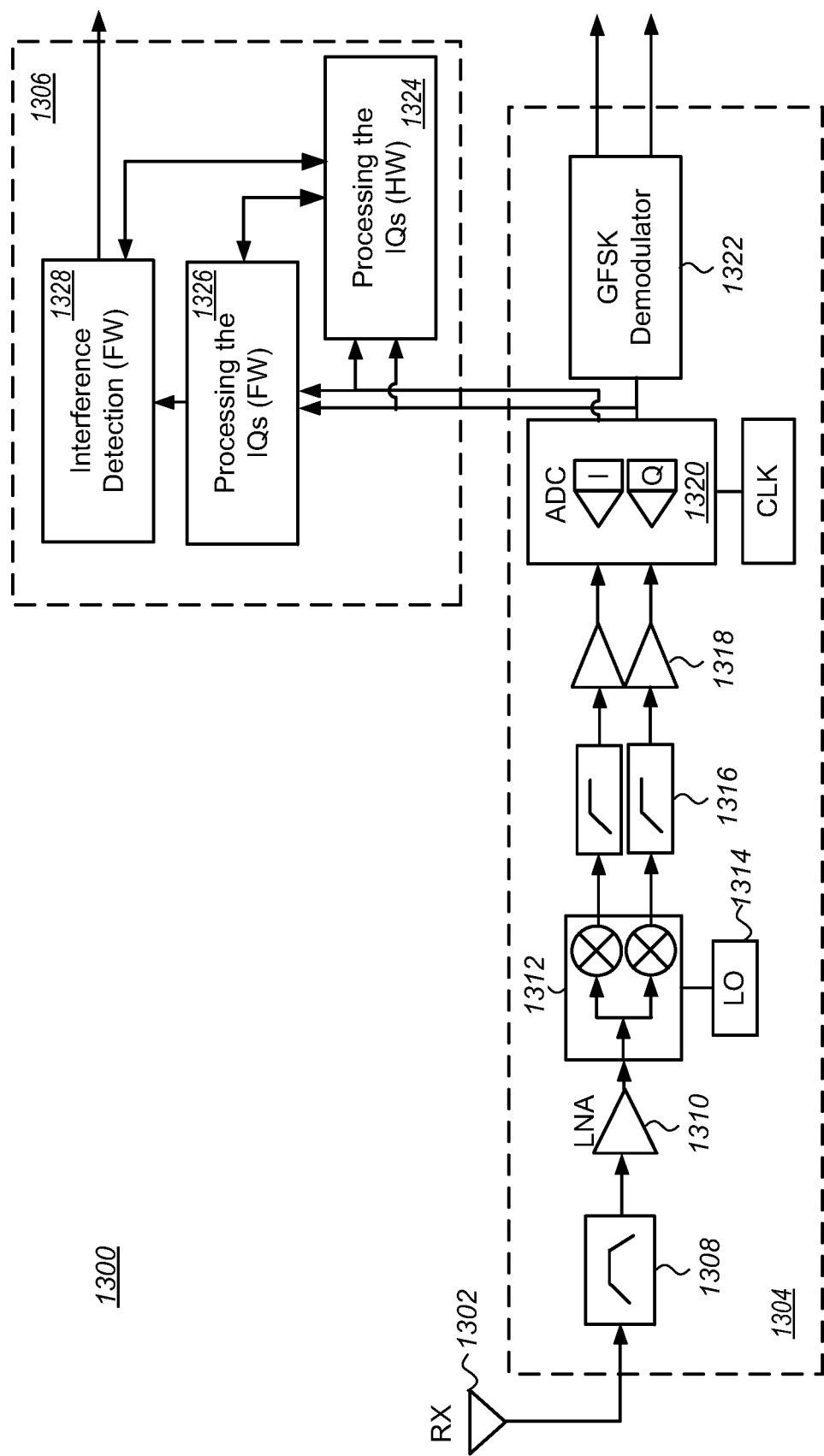
FIG. 13 is a schematic block diagram illustrating an embodiment of an architecture that can be implemented in either or both ranging devices, to execute an algorithm and make a local decision either to exchange the constant tone or skip the tone exchange for the subsequent channel(s) and/or epoch(s).

FIG. 13 is a schematic block diagram illustrating a portion of a wireless device 1300, such as a transceiver or transponder, including an antenna 1302, a receiver portion 1304 of the transceiver, and an embodiment of an architecture or block 1306 to execute an algorithm and make a local decision either to exchange the constant tone or skip the tone exchange for the subsequent channel(s) and/or epoch(s).

Referring to FIG. 13, the receiver portion 1304 includes a RF bandpass filter 1308 to block out any strong out-of-band signals, a low noise amplifier (LNA) 1310 to amplify the received RF signals, including a CT or continuous wave carrier signal used for the agile multicarrier phase ranging process, and a downconversion RF mixer 1312 coupled to an output of the LNA and to a local oscillator (LO) 1314 to transform the RF frequency to the lower intermediate frequency (IF). An active complex filter 1316 and a amplitude limiter to remove any amplitude perturbations 1318 coupled to an analog to digital converter ADC 1320 to convert the received signals from analog to digital, and a Gaussian frequency-shift keying (GFSK) demodulator 1322 to demodulate the digital signal.

The architecture or block 1306 to execute the algorithm generally includes hardware, such as a processor 1324, to apply signal processing on the received signal, IQ processing software 1326, such as firmware embodied in memory in or coupled to the processor, to apply signal processing on the raw IQ samples, and interference detection software 1328, such as firmware embodied in memory in or coupled to the processor, to decide if the samples are inteferred or not.

Thus, wireless devices including hardware and/or software to enable agile multicarrier phase ranging and methods for operating the same to detect and mitigate effects of interference from coexistent devices in the network have been disclosed. Embodiments of the present invention have been described above with the aid of functional and schematic block diagrams illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

It is to be understood that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The breadth and scope of the present invention should not be limited by any of the above-described exemplary embodiments, but should be defined only in accordance with the following claims and their equivalents.

What is claimed is:

1. A method of ranging between two wireless transceivers comprising:
   performing a handshake between a first transceiver and a second transceiver negotiating a list of channels and a start time for a multicarrier phase ranging process;
   performing a cycle of the multicarrier phase ranging process including:
      exchanging in a first epoch on a first channel a Constant Tone (CT) between the first and second transceiver;
      processing the CT received in the first and second transceiver to measure a difference in phase between the CT received and a reference signal;
      checking for interference in the CT received with at least one of the first transceiver and the second transceiver, and:
      if no interference is detected, switching to a second channel and in a second epoch exchanging the CT between the first and second transceiver; and
      if interference is detected:
         informing the first transceiver or second transceiver, skipping at least the second channel and staying idle for at least a second epoch; and
         performing a number (n) of subsequent cycles while skipping any channels in the list of channels skipped in a previous cycle based on interference detected, wherein the number (n) of subsequent cycles for which channels in the list of channels are skipped is based on a property of the interference detected, the property of the interference including a strength of the interference, length of the interference, repetition of the interference in time domain or a bandwidth of interference in frequency domain.

2. The method of claim 1 further comprising after checking for interference checking if the first channel is a last channel in the list of channels, and if the first channel is the last channel ending the cycle and exchanging between the first and second transceiver results of the measured difference in phase, and performing another cycle of the multicarrier phase ranging process without skipping any channels in the list of channels based on interference detected in a previous cycle.

3. The method of claim 1, wherein informing the first transceiver or second transceiver comprises sending the CT with a shorter length of time ($t_L$) for each CT than agreed on in the handshake.

4. The method of claim 1, wherein performing the cycle of the multicarrier phase ranging process further comprises exchanging a packet between the first and second transceiver before or after exchanging the CT.

5. The method of claim 4, wherein informing the first transceiver or second transceiver comprises not transmitting at least one of the packet and the CT from the first transceiver or the second transceiver detecting interference.

6. The method of claim 4, wherein the packet is exchanged after the CT, and wherein informing the first transceiver or second transceiver interference has been detected comprises sending a packet with a specific Access Address.

7. The method of claim 4, wherein the packet is exchanged after the CT, and wherein informing the first transceiver or second transceiver comprises sending a packet with information identifying interfered channels to skip.

8. The method of claim 1, wherein processing the CT in the first and second transceivers comprises generating in the first and second transceivers In-Phase and Quadrature (IQ) samples of the CT received therein, and wherein checking for interference in the CT received comprises checking for interference in the IQ samples.

9. The method of claim 1, wherein the multicarrier phase ranging process uses linear channel switching.

10. A method of ranging between two wireless transceivers comprising:
performing a handshake between a first transceiver and a second transceiver, the handshaking including negotiating a list of channels, and a start time for a multicarrier phase ranging process; and
performing a cycle of the multicarrier phase ranging process, the cycle including for each channel in the list of channels:
exchanging a CT between the first transceiver and second transceiver over the channel during a first epoch of a plurality of epochs;
processing the CT received in the first transceiver and second transceiver to measure a phase difference between the CT received and a local reference signal; and
checking for interference in the CT received with at least one of the first transceiver and the second transceiver, wherein:
if no interference is detected, switching to another channel in the list of channels and exchanging the CT between the first transceiver and second transceiver in a second epoch; and
if interference is detected, informing the first transceiver or second transceiver, skipping at least one other channel in the list of channels and staying idle for at least one other epoch in the plurality of epochs.

11. The method of claim 10 further comprising after the cycle is complete exchanging between the first and second transceiver results of the measured phase difference for each channel in the list of channels, performing another cycle of the multicarrier phase ranging process without skipping any channels in the list of channels based on interference detected in a previous cycle.

12. The method of claim 10 further comprising after the cycle is complete exchanging between the first and second transceiver results of the measured phase difference for each channel in the list of channels, performing another cycle of the multicarrier phase ranging process skipping exchanging the CT on any channel in the list of channels on which interference was detected in a previous cycle.

13. The method of claim 10, wherein the multicarrier phase ranging process uses pseudo-random channel switching.

14. A system for determining a range between two wireless transceivers comprising:
a first transceiver and a second transceiver each comprising a processor configured to execute program code in firmware to:
negotiate a list of channels and a start time for a multicarrier phase ranging process; and
perform a number of cycles of the multicarrier phase ranging process, each cycle including for each channel in the list of channels:
exchanging a CT between the first transceiver and second transceiver over the channel during a first epoch of a plurality of epochs;
measuring in the first transceiver and second transceiver a phase difference between the CT received and a local reference signal; and
checking for interference in the CT received with at least one of the first transceiver and the second transceiver, wherein:
if no interference is detected, switching to another channel in the list of channels and exchanging the CT between the first transceiver and second transceiver in a second epoch; and
if interference is detected:
informing the first transceiver or second transceiver, skipping at least one other channel in the list of channels and staying idle for at least one other epoch in the plurality of epochs; and
performing a number (n) of subsequent cycles while skipping any channels in the list of channels skipped in a previous cycle based on interference detected, wherein the number (n) of subsequent cycles for which channels in the list of channels are skipped is based on a property of the interference detected, the property of the interference including a strength of the interference, length of the interference, repetition of the interference in time domain or a bandwidth of interference in frequency domain.

15. The system of claim 14 wherein the processor is further configured to execute program code to generate in the first and second transceivers In-Phase and Quadrature (IQ) samples of the CT received therein, and wherein checking for interference in the CT received comprises checking for interference in the IQ samples.

16. The system of claim 14 wherein the processor is further configured to execute program code to exchange phase measurement results from which the range between the first and second transceiver is determined, and to execute subsequent cycles of the multicarrier phase ranging process skipping exchanging the CT on any channel in the list of channels on which interference was detected in a previous cycle.

17. The system of claim 14 wherein the processor is further configured to execute program code to exchange phase measurement results from which the range between the first and second transceiver is determined, and to execute subsequent cycles of the multicarrier phase ranging process without skipping any channels in the list of channels based on interference detected in a previous cycle.

* * * * *